United States Patent Office 3,412,467
Patented Nov. 26, 1968

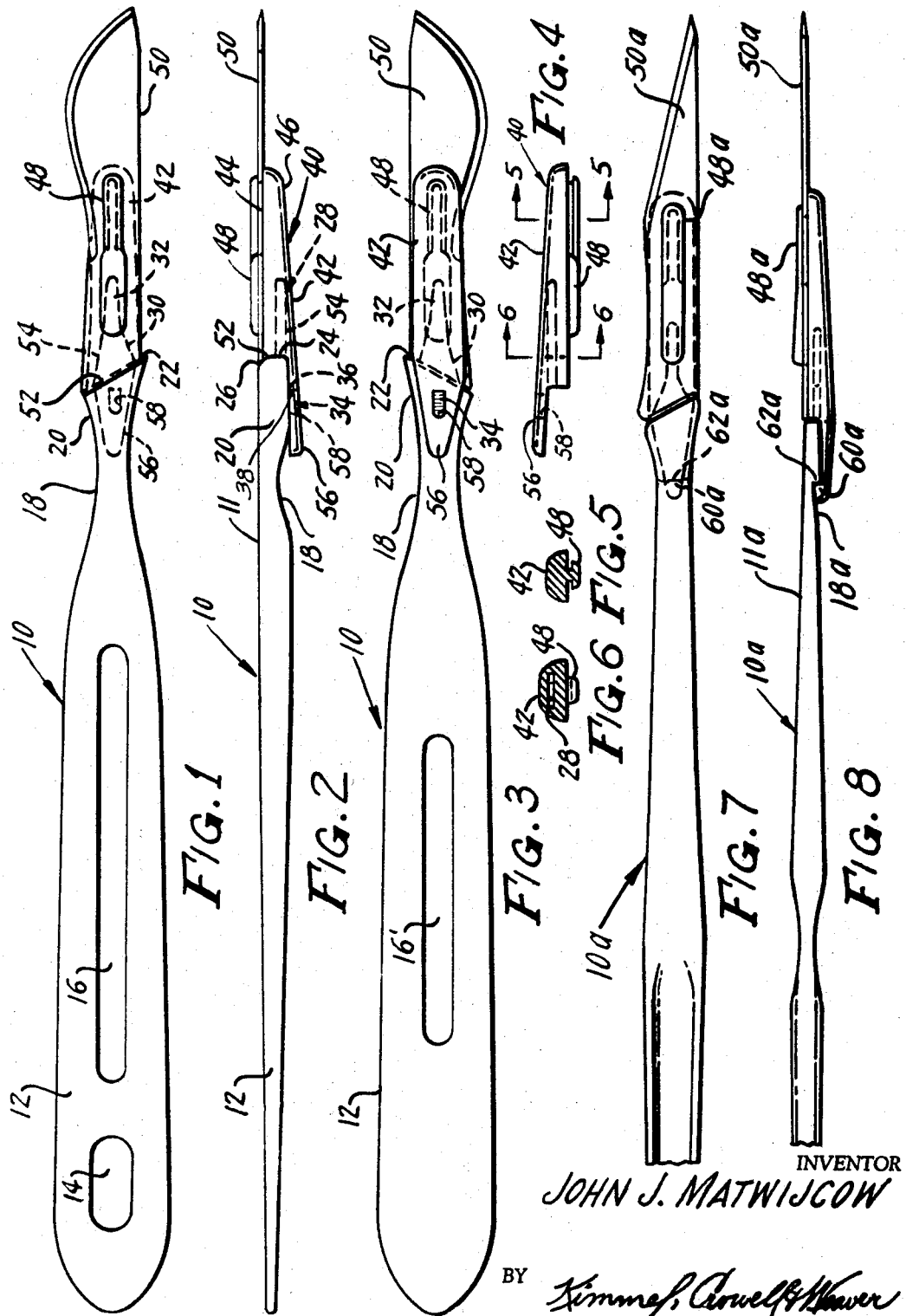

3,412,467
SURGICAL SCALPEL
John J. Matwijcow, 31 Charles Terrace,
New Market, N.J.
Filed Nov. 25, 1966, Ser. No. 596,884
5 Claims. (Cl. 30—335)

ABSTRACT OF THE DISCLOSURE

A combined scalpel handle, blade holder and blade wherein the blade holder receives a tongue on the handle and has shoulders complementarily mating with shoulders on the handle, a blade retaining construction on one side of the blade holder and a rearwardly extending shank on the other side of the blade holder engaging a protuberance or a boss on the handle, said handle including a neck portion of reduced size joining a head to the handle and being substantially linear along one side, and said blade being disposed approximately in line with the linear side of the handle.

---

This invention relates to a surgical scalpel generally of the type described in my copending application, Ser. No. 488,176, filed Sept. 17, 1965, now United States Patent No. 3,311,976, and constitutes an improvement thereon. More particularly, this invention relates to a surgical scalpel having a reusable handle and a disposable blade and a blade support.

Reusable handles are known in the prior art for use with replaceable blades and blade supports, but serious difficulties have been encountered in the past providing structures and means for permitting easy attachment and removal of blade supports from the handles. It is therefore an object of this invention to provide a combination surgical scalpel having a reusable handle and an easily and quickly detachable blade support and a blade.

A further object of the present invention is the provision of a novel scalpel handle and a complementarily formed blade support for easy attachment to and removal from the scalpel handle.

The provision of a novel blade support which is smaller, more easily handled, packaged, sterilized and used, and which is more easily attached to and removed from handles than those known in the prior art is an additional object of this invention.

Specific combinations and structures and combinations of structures as described in the specification hereinafter and shown in the drawing constitutes a further object of this invention.

In the drawing:

FIGURE 1 is a side view showing a first side of the handle, blade support and blade of this invention;

FIGURE 2 is an edge view of the surgical scalpel of FIGURE 1 showing the handle, blade support and blade and the relative interconnection therebetween;

FIGURE 3 is a view of a second side of the scalpel of this invention as shown in FIGURE 1;

FIGURE 4 is a detailed view of the blade support of the present invention;

FIGURE 5 is an end view in cross-section of the blade support of FIGURE 4 taken substantially along lines 5—5 in the direction of the arrows of FIGURE 4;

FIGURE 6 is an end view in cross-section of the blade support of FIGURE 4 taken substantially along line 6—6 in the direction of the arrows as shown in FIGURE 4;

FIGURE 7 is a modified embodiment of the invention of FIGURE 1 showing a first side of the scalpel; and FIGURE 8 is an edge view of the scalpel of FIGURE 7.

Reference is now made to FIGURES 1 through 6 which shows a preferred embodiment of the invention.

The surgical scalpel of this invention comprises a handle 10 which, in a highly preferred embodiment, has a straight linear side 11 extending from one end to the other, as will be described. The handle comprises a shank 12 which may have an aperture 14 therein and grooves 16 on the respective sides thereof. The handle further comprises a neck on one end of the shank. The neck, in the preferred embodiment, has one straight linear side and is reduced in size relative to the shank on three sides, as shown best in FIGURES 1 and 2. An enlarged head 20 is provided on the neck. The head also has one straight linear portion as described with reference to the handle generally and has a substantially flat distal end 22 disposed perpendicularly to the axis of the head and, in the preferred embodiment, to the axis of the handle in one plane and is disposed angularly relative to the handle axis in the other plane forming an acute angle and a complementary obtuse angle with respect to the axis of the head. The end 22 comprises a flat portion which is disposed angularly as described and is provided with a beveled edge portion 26 along a first side of the head. Beveled edge portion 26 extends between the end 24 and the first side, which in the preferred embodiment, is a straight linear side, of the head. In the preferred embodiment, the straight linear sides of the shank, neck and head are disposed linearly adjacent each other to form a single linear side along the entire length of the handle from the distal end of the shank to the beveled edge portion at the distal end of the head.

A tongue 28 extends from a second side of the flat surface 24 of the distal end 22 of the head 20 in a direction parallel to the axis of the head, and in the preferred embodiment, parallel to the axis of the handle. Tongue 28 comprises an enlarged trunk portion 30 which, in cross-section, is rectangular in shape having an enlarged portion secured to the distal end of the head on the second side of end 24 and tapering inwardly in at least two opposite planes relative to each other to a diminished distal portion which extends further in the form of an elongate generally right angularly shaped tip portion 32. In the preferred embodiment, the tip portion varies slightly from a right rectangle and tapers inwardly slightly toward the distal end thereof.

Catch means are provided on the head for engaging a blade support to secure the blade support to the head. In a preferred embodiment, the head catch means comprises a catch boss 34 which tapers from its front end 36 outwardly to a rear point 38 and which extends from the second side of the head.

A blade support 40 is secured to the handle as will be described. The blade support 40 comprises a body portion 42 which has a first flat side 44 and an opposite rounded side 46. An elongate boss 48 extends from the first side of the body, which is flat, for securing a scalpel blade thereto. The shape of this boss is adequately disclosed and described in my prior application and in my prior Patent No. 2,960,769 and is formed in the conventional shape. The elongate boss 48 secured blade 50 to the blade support in the conventional manner.

A lip 52 is disposed on the first side of the body 42 in overlying engaging relation relative to the beveled edge portion on the head. While this overlying relation is not essential to the securing of the blade support to the handle, it provides additional rigidity and a more secure connection of the blade support to the handle. A socket 54 is formed in the body complementarily to the tongue and receives the tongue therein.

A rearward extension 56 extends in overlying relation to the second side of the head parallel to the head axis, and in the preferred embodiment, to the handle axis, and has means integrally formed therein for engaging the head catch means to secure the blade support to the head. In a preferred embodiment, the means formed integrally in the rearward extension 56 comprises an aperture 58 in the rearward extension 56 for securing engagement by the head catch boss.

In an alternative and also highly preferred embodiment of the invention, as shown in FIGURES 7 and 8, the means formed integrally with the rearward extension 56 for engagement by the head catch means comprises a locking boss 60A which cooperatively engages a catch ledge 62A formed by the proximate end of the second side of the head extending to the neck in a direction substantially perpendicularly to the axis of the neck and the head.

There are several important features of the invention which should be mentioned.

It will be noted, for example, that one side of the scalpel handle is in the form of a straight linear side which is coaxial with the direction of extension of the blade 50. This enables more precise control and sighting of the scalpel during use.

A beveled edge portion 26 is provided which cooperates with a lip extension 52, in one embodiment of the invention, to more securely fix the blade support on the end of the handle. Alternatively, the lip 52 may be omitted and the blade 50 may extend into the beveled edge portion 26.

The provision of complementary means on the second side of the head and on the rearward extension of the blade support for securingly engaging the blade support to the head permits the blade support to be more easily attached to and removed from the handle. Moreover, this novel arrangement permits the handle and the blade support to be formed in less complicated shapes than have been heretofore known with the attendant advantages of more convenient use, easier cleaning and sterilization, and more economical manufacture. Indeed, these blade supports may be manufactured so economically and secured to blades as to permit the blade support and the blade to be disposable. This permits the surgeon to use a new scalpel blade which has been previously sterilized with each operation, thereby obviating any possibility of having a dull scalpel.

Other advantages of the invention will be apparent to those skilled in the art.

While the present invention has been described with reference to particular embodiments and specific structures as shown in the drawing, it will be realized that the drawing is intended as exemplary only and not in the limiting sense. The scope of the invention is defined in the appended claims.

I claim:
1. In combination, a surgical scalpel comprising:
   a handle, which comprises,
      an elongate shank having one straight linear side,
      a neck on one end of the shank, said neck having one straight linear side and being reduced in size relative to the shank on three sides, and
      an enlarged head on the neck, said head having, one straight linear side portion,
         a substantially flat distal end, said distal end being disposed angularly to the handle axis,
         a beveled edge portion along said one side of the head extending between the end and the side of the head, the straight linear sides of the shank, neck and head disposed linearly adjacent each other to form a linear side along the entire length thereof from the distal end of the shank to the beveled edge portion at the distal end of the head,
         head catch means for engaging a blade support to secure the blade support to the head;
      a tongue extending from the other side of the distal end of the head parallel to the handle axis, said tongue comprising,
         an enlarged rectangular trunk portion secured to the distal end of the head, said enlarged rectangular trunk portion tapering inwardly in at least two opposite planes relative to each other, and
         an elongate generally right rectangularly shaped tip portion on the distal end of the trunk portion;
   a disposable blade support, which comprises,
      a body portion having one flat side, an opposite rounded side, and a proximate end which is flat and complementarily angularly disposed to mate with the distal end of the head,
      an elongate boss on the flat side of the body for securing a scalpel blade thereto,
      a lip on the one side of the body, said lip disposed in overlying engaging relation relative to the beveled edge portion of the head,
      a socket in the body complementarily receiving the tongue,
      a rearward extension on the other side of the body, said rearward extension overlying the other side of the head parallel to the handle axis, and
      means formed integrally with the rearward extension engaged by the head catch means for engaging the blade support to secure the blade support to the head; and
   a scalpel blade secured by the boss on the blade support.
2. The invention of claim 1 wherein
the head catch means comprises a catch ledge formed by the proximate end of the other side of the head extending to the neck perpendicularly to the handle axis; and
the means formed integrally with the rearward extension for engagement by the head catch means comprises a locking boss on the rearward end of the rearward extension for securing engagement by the head catch ledge.
3. The invention of claim 1 wherein:
the head catch means comprises a catch boss extending from the other side of the head; and
the means formed integrally with the rearward extension for engagement by the head catch means comprises an aperture in the rearward extension for securing engagement by the head catch boss.
4. In combination, a surgical scalpel comprising:
a handle having an elongate shank, said shank having a reduced neck portion integrally formed on one end thereof and an enlarged head on the other end of said neck portion, said head having a relatively flat distal end and first and second sides;
a tongue extending from the distal end;
a blade support having a socket therein, said socket complementarily receiving the tongue, said blade support having a first side and a second side;
means on the first side of the blade support for securing a scalpel blade thereto, said first side of the blade support disposed adjacent the first side of the head;
a rearward extension on the second side of the blade support in overlying relation to the second side of the head; and
complementary means on the second side of the head and on the rearward extension for securingly engaging the blade support to the head, said complementary means comprising a catch ledge extending from the second side of the head to the neck substantially perpendicular to the axis of the neck, and a locking boss on the rearward extension engaging the catch ledge.
5. The invention of claim 4 wherein:

the distal end of the head is disposed angularly relative to the axis of the head; and the proximate end of the blade support has a flat end complementarily angularly disposed to mate with the distal end of the head.

References Cited

UNITED STATES PATENTS

| | | | |
|---|---|---|---|
| 1,563,674 | 12/1925 | Stuart | 30—339 X |
| 1,706,712 | 3/1929 | Sklar | 30—33 |
| 3,311,976 | 4/1967 | Matwijcow | 30—33 |
| 3,085,332 | 4/1963 | Raybin | 30—33 |
| 2,960,769 | 11/1960 | Matwijcow | 30—339 |
| 1,940,855 | 12/1933 | Friedman. | |

ANDREW R. JUHASZ, *Primary Examiner.*

G. WEIDENFELD, *Assistant Examiner.*